Dec. 5, 1944.  T. A. COLUMBE  2,364,193
MACHINE GUARD
Filed Aug. 7, 1943
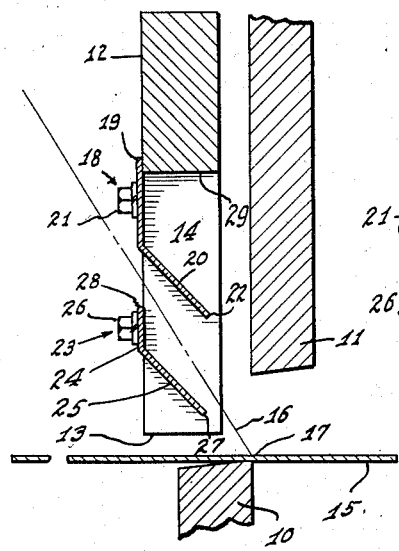
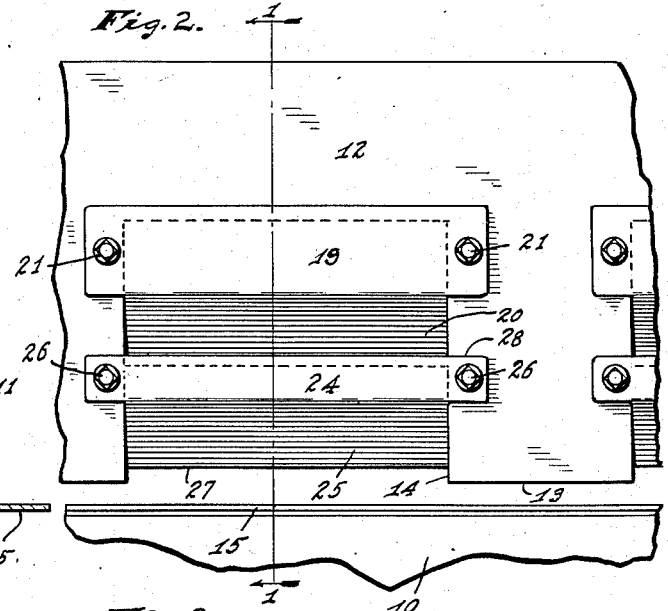
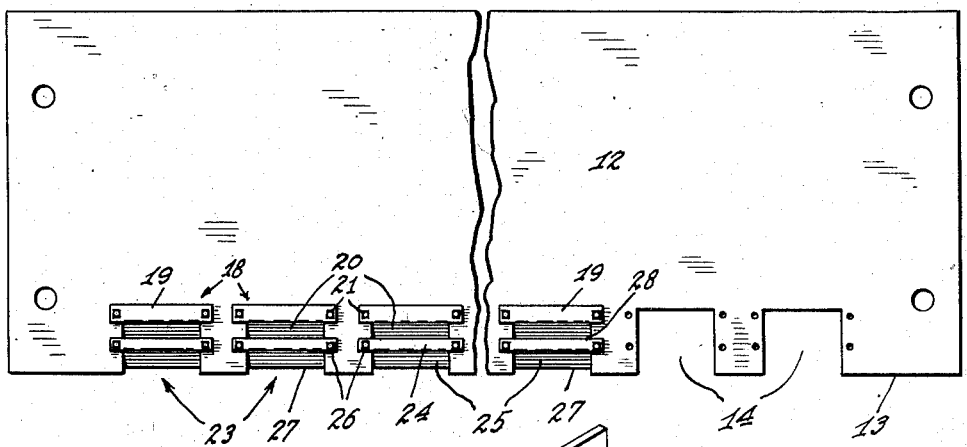
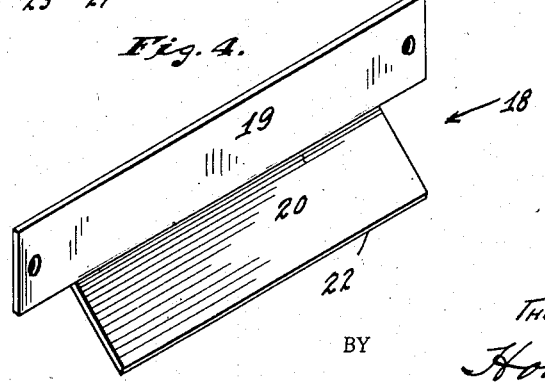
INVENTOR.
Thomas A. Columbe
BY
Hood & Hahn
ATTORNEYS.

Patented Dec. 5, 1944

2,364,193

UNITED STATES PATENT OFFICE 2,364,193

MACHINE GUARD

Thomas A. Columbe, Chicago, Ill., assignor to The Liquid Carbonic Corporation, Chicago, Ill., a corporation of Delaware Application August 7, 1943, Serial No. 497,787

5 Claims. (Cl. 74—612)

The present invention relates to machine guards, and the primary object of the invention is to provide a guard for a machine having a moving actuated element, of such character as positively to prevent the projection of the hand of the operator into the intersection between the plane of movement of the actuated machine element and the work, while yet permitting the operator to have a relatively unobstructed view of that intersection. Further objects of the invention will appear as the description proceeds.

Most machine guards either are so constructed as to prevent a clear view of the line or point upon which the actuated machine element is going to engage the work, or are so constructed that they may be temporarily swung out of the way to permit such a view during adjustment of the machine and/or of the work, in which latter case the guard is supposed to be swung back into obstructing position before the machine is actuated. The disadvantages of the first-mentioned form of guard are obvious without discussion; and it is notoriously a fact that workers do become careless and have a very strong tendency to refrain from throwing the latter form of guard into protective position before actuating the machine, whereby frequent accidents occur. According to the present invention, I provide a guard which is incapable of being thrown out of protective position, but I so construct that guard that, although it is impossible for the operator to project his hand into the intersection between the work and the plane of movement of the actuated machine element, he nevertheless has a clear view of that intersection.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a transverse section through a guard constructed in accordance with the present invention, and shown in association with the blades of a plate shear, said section being taken upon the line 1—1 of Fig. 2;

Fig. 2 is a fragmental elevation of the structure illustrated in Fig. 1;

Fig. 3 is a broken elevation, upon a considerably reduced scale, of a standard form of stationary guard, with which have been associated certain elements embodying the features of my invention; and Fig. 4 is an isometric view of a louvre plate used in practicing my invention.

While the inventive concept underlying the present disclosure is, of course, applicable to guards for various kinds of machines, for convenience of illustration I have chosen a plate shear of standard form including a stationary blade 10 and a reciprocable blade 11, which latter blade reciprocates between substantially the position illustrated and a position in which its lower edge is beneath the plane of the upper edge of the stationary blade 10. A reciprocable guard or hold-down member 12 is customarily provided in such a machine, the lower edge 13 of said guard being located, even in its uppermost position, so close to the plane of the work 15 as to prevent the projection of the operator's hand into the intersection between the plane of reciprocation of the blade 11, and the work. To provide a view of that intersection, however, which will make it possible for the operator to locate the work before tripping the reciprocable blade 11, the lower edge of the guard or shield 12 is notched, as at 14, and the vertical extent of the notches 14 is such as to permit the operator to insert his hand through a notch, and so into that intersection. As is shown by the broken line 16 in Fig. 1, the line of vision connecting the operator's eye with the intersection 17 extends through the notches 14.

One form of means for preventing the projection of an operator's hand through the notches 14, without interfering with the operator's view of the intersection line 17, is illustrated in the accompanying drawing. That illustrated form comprises a louvre plate 18 consisting of a depending portion 19 located substantially in the plane of the shield 12, and a downwardly and inwardly inclined portion 20 merging with the lower edge of the plate portion 19. The plate portion 19 preferably overlaps the edges of the associated notch 14 and is secured to the shield 12 by bolts or screws 21, or similar fastening means, while the portion 20 is reduced in lateral extent to fit snugly into the notch 14.

A second louvre plate, indicated generally by the reference numeral 23, comprises a depending portion 24 located substantially in the plane of the shield 12, and a downwardly and inwardly projecting portion 25, the portion 24 overlapping the edges of the notch and being secured to the guard 12 by screws 26 or the like, and the portion 25 being reduced in lateral extent to fit snugly within the notch 14, in substantial parallelism with the portion 20 of the plate 18. As is clearly shown, in Fig. 1, the free edge 22 of the portion 20 of the plate 18 lies below the horizontal plane including the upper edge 28 of the portion 24 of the plate 23, while the free edge 27 of the portion 25 of the plate 23 lies so close to the work 15 as to prevent the insertion of the operator's hand into the region of the intersection 17.

While I have shown the louvre plates of the present application in short sections to be individually associated with the individual notches 14 in a notched shield 12, it will be obvious that various changes in that specific construction could be made. For instance, each element 19 and each element 24 might extend the full length of the shield, each of said elements being provided with a plurality of downwardly and inwardly inclined tongues 20 and 25 respectively registering with and entering the notches 14 in the shield 12. As a further alternative, the shield tongues projecting downwardly between notches 14 might be eliminated, so that the lowermost edge of the shield would lie in the plane of the upper boundary 29 of the notches 14, in which case a single element, extending the full length of the shield, and provided with continuous downwardly and inwardly inclined tongues performing the functions of the tongues 20 and 25, might be secured to the lower edge of the shield 12, said element providing a plurality of portions equivalent to the portions 19 and 24, and joined together by integral ties at their opposite ends, said ties being located beyond the ends of the tongues performing the functions of the tongues 20 and 25. Such modifications, coming within the terms of the appended claims, are intended to be included in the spirit of the invention herein disclosed, and the above description of those modifications is intended to be merely by way of example, and not exclusive.

I claim as my invention:

1. A safety guard for machinery comprising an element mounted between the operator's station and the plane of movement of the actuated member of the machine and positioned so close to the work as to prevent the insertion of the operator's hand into said plane, said guard being provided with a window positioned in the line joining the operator's eye with the intersection of said plane with the work and means to prevent the insertion of the operator's hand therethrough, comprising a bar traversing said window between its top and bottom, a louvre plate projecting from the top of the window toward said plane and below the level of said bar, and a further louvre plate projecting from the level of said bar downwardly and toward said plane.

2. A safety guard for machinery comprising an element mounted between the operator's station and the plane of movement of the actuated member of the machine and positioned so close to the work as to prevent the insertion of the operator's hand into said plane, said guard being provided with a window positioned in the line joining the operator's eye with the intersection of said plane with the work, said window being guarded against projection of the operator's hand therethrough into such intersection by louvre means including a portion inclined downwardly and toward said plane to prevent such projection without obstructing such line of vision.

3. A safety guard for machinery comprising an element mounted between the operator's station and the plane of movement of the actuated member of the machine, and means for preventing the projection of the operator's hand into the intersection of said plane with the work, comprising two members fixedly secured to said element one below the other, the upper of said members having a portion inclined downwardly toward said plane and projecting below the horizontal plane of the upper edge of the lower member, the space between said members being located in the line extending between the eye of the operator and said intersection, and the lower edge of the lower member being so close to the work as to prevent insertion of the operator's hand therebetween.

4. As an article of manufacture, a machine guard comprising a shield adapted to be mounted between an operator's station and the plane of movement of an actuated member of a machine, said shield being provided, adjacent its edge proximate to the work, with a plurality of plates, said plates being fixedly secured to said shield one above the other, and each of said plates comprising a depending portion lying substantially in the plane of said shield and an angularly related portion inclining toward the work and toward said plane of movement, said plates defining therebetween a window giving the operator a view of the intersection between said plane of movement and the work while preventing the projection of a hand of the operator into said intersection.

5. As an article of manufacture, a machine guard comprising a shield adapted to be mounted between an operator's station and the plane of movement of an actuated member of a machine, said shield being provided, adjacent its edge proximate to the work, with a plurality of plates, said plates being fixedly secured to said shield one above the other, and each of said plates comprising a depending portion lying substantially in the plane of said shield and an angularly related portion inclining toward the work and toward said plane of movement, the free edge of the inclined portion of one of said plates intersecting the plane including the adjacent edge of the first-mentioned portion of the next subjacent plate and perpendicular to the plane of said shield.

THOMAS A. COLUMBE.